United States Patent [19]

Blong et al.

[11] Patent Number: 5,549,948
[45] Date of Patent: Aug. 27, 1996

[54] MELT-PROCESSABLE FLUOROPLASTIC

[75] Inventors: Thomas J. Blong, Woodbury, Minn.; Claude Lavallée, London, Canada

[73] Assignee: Minnesota Mining and Manufacturing Company, St. Paul, Minn.

[21] Appl. No.: 300,640

[22] Filed: Sep. 2, 1994

[51] Int. Cl.⁶ ............ C08L 27/16; C08L 27/18; C08L 27/20; C08L 23/02
[52] U.S. Cl. ............ 428/36.9; 525/199; 525/200; 525/187; 524/520; 524/487; 524/377
[58] Field of Search ............ 525/199, 200, 525/187; 428/36.9; 524/520, 377, 487

[56] References Cited

U.S. PATENT DOCUMENTS

| | | | |
|---|---|---|---|
| 2,986,649 | 1/1961 | Pailthoup et al. | |
| 3,125,547 | 3/1964 | Blatz | 260/45.5 |
| 3,519,703 | 7/1970 | Menkl et al. | |
| 4,013,622 | 3/1977 | DeJuneaus et al. | 260/45.95 S |
| 4,129,717 | 12/1978 | Practorius et al. | 528/421 |
| 4,159,975 | 7/1979 | Practorius et al. | 525/91 |
| 4,328,140 | 5/1982 | Singletary et al. | |
| 4,617,351 | 10/1986 | Heckel, Jr. et al. | 525/199 |
| 4,670,503 | 6/1987 | Newmann et al. | 524/520 |
| 4,764,573 | 5/1988 | Arcella et al. | |
| 4,855,360 | 8/1989 | Duchesne et al. | 525/187 |
| 5,051,479 | 9/1991 | Logothetis et al. | 525/197 |
| 5,206,293 | 4/1993 | Sakai et al. | |
| 5,284,184 | 2/1994 | Noone et al. | 138/121 |

FOREIGN PATENT DOCUMENTS

| | | | |
|---|---|---|---|
| 958837 | 12/1974 | Canada | 400/90 |
| 2-308841 | 12/1990 | Japan. | |
| 1293667 | 10/1972 | United Kingdom | C08F 29/22 |

OTHER PUBLICATIONS

Modern Plastics 1963 ED–pp. 227–1962.
Brydson, J. A., Chap. 5, "Flow Properties of Polymer Melt," Van Nostrand Reinhold Co., New York (1970).
Rauwendaal, C., "Polymer Extrusion,"Hansen Publishers, pp. 23–48 (1986).

*Primary Examiner*—Carman J. Seccuro, Jr.
*Attorney, Agent, or Firm*—Gary L. Griswold; Walter N. Kirn; John A. Burtis

[57] ABSTRACT

This invention provides a melt-processable fluoroplastic composition comprising a blend of a melt-processable thermoplastic fluoropolymer component of interpolymerized units derived from vinylidene fluoride and an ethylenically-unsaturated, copolymerizable, fluorinated comonomer, and a hydrocarbon polymer component comprising a poller of ethylene or propylene. The composition is useful for making shaped articles including tubing or film.

20 Claims, No Drawings

MELT-PROCESSABLE FLUOROPLASTIC

This invention relates to thermoplastic fluoropolymer compositions, their preparation and use, and to shaped articles, such as films and tubing, made by melt-processing said compositions, for example, by extrusion thereof. In another aspect, this invention relates to improving flow properties of thermoplastic fluoropolymer compositions used to make extruded shaped articles thereof so as to make them at fast extrusion rates and with reduced melt defects, such as melt fractures.

Various shaped plastic articles, such as extruded film and tubing, can be fabricated from melt-processable thermoplastic hydrocarbon polymers, such as polyethylene - see, for example, U.S. Pat. No. 3,125,547 (Blatz). Increasing environmental concerns have focused on fabricating many of such articles from melt-processable fluoropolymers by reason of their relative chemical resistance, thermal stability, and physical strength. For example, Canadian Pat. No. 958,837 (Dukert et al) together with the corresponding British Pat. Specification 1,293,667 describe melt fabrication of wire insulation, film, and pipe from a blend of certain vinylidene fluoride polymer and compatible polyethylene. U.S. Pat. No. 4,617,351 (Heckel, Jr. et al.) describes enhancing the extrusion rate of certain melt extrudable thermoplastic perfluorocarbon polymers by adding up to 1% by weight of hydrocarbon polymer, such as polyethylene. U.S. Pat. No. 5,051,479 (Logothetis et al.) describes a melt-processable thermoplastic composition consisting essentially of a blend of a melt processable fluorocarbon polymer, such as a copolymer of tetrafluoroethylene, and 0.05 to 0.5 percent by weight of a particular elastomeric polymer of tetrafluoroethylene to improve the processability of the copolymer.

A relatively new class of fluoropolymers which has become commercially available is the class of thermoplastic, chemically resistant, thermally stable, optically clear, low permeable terpolymers of tetrafluoroethylene, hexafluoropropylene, and vinylidene fluoride comonomers combined in different ratios to get a range of different melting points. These fluoropolymers are more flexible and can be melt-processed at lower temperatures than most other fluoroplastics, such as polyvinylidene fluoride and ethylene-tetrafluoroethylene copolymers. A series or family of these fluoropolymers is sold as "3M THV Fluoroplastics" by the 3M Company and can be used to prepare, for example, molded parts and extruded films, tubing, and profiles. Because these fluoropolymers are more flexible than other melt-processable fluoroplastics, can be easily bent or shaped, and have low permeability, they find particular use as permeation barriers in automotive fuel lines, vapor recovery lines, and fill or vent hoses. While these fluoroplastics have many advantageous performance and processing properties, we have found that under some melt-processing conditions some of these fluoroplastics form extrudates whose surfaces are undesirably rough or exhibit a melt fracture in the form of surface irregularity known in polymer melt technology as "sharkskin"—see, for example, Brydson, J.A., Chap. 5, "Flow Properties of Polymer Melt," Van Nostrand Reinhold Co., New York (1970). Such defective surfaces make such extrudates less suitable for use as fuel line hose or catheters where surface smoothness is important to the utility of such shaped articles. Specifically, smoothness is a requirement for catheters to ensure uniform liquid flow therethrough and to allow smooth insertion of wires or probes. In fuel line hose, a smooth surface is preferred to allow laminar liquid flow and to obtain a low permeation rate.

We have discovered that by blending melt-processable, thermoplastic fluoropolymers of vinylidene fluoride and one or more ethylenically-unsaturated comonomers, such as the above-described 3M THV Fluoroplastics, with small amounts of some hydrocarbon polymers of olefins, such as polyethylene, that the resulting blends can be melt processed at relatively low melt temperatures with improved flow properties, such as relatively low shear stress, to readily form extrudates with desired smooth surfaces which enable or enhance their uses where such properties, coupled with retained fluoropolymer properties, are desired or required, such as in fuel line hose or tubing. These improvements are obtained without the need, for example, to modify the chemical structure of the fluoropolymer, to raise the melt-processing temperature, or to extrude at lower line speeds and shear rates—measures sometimes resorted to in melt-processing plastics to reduce melt fracture.

According to an aspect of this invention, a melt-processable fluoroplastic composition is provided which comprises a blend of (a) a fluoropolymer component which is a major amount (i.e., greater than 50%) by weight of the composition and is melt-processable, thermoplastic fluoropolymer of interpolymerized units derived from vinylidene fluoride and more than 25 wt % ethylenically-unsaturated, copolymerizable, fluorinated comonomer, such as (1) fluorinated alpha-olefin represented by the formula $R_fCF=CF_2$, where $R_f$ is H, F, Cl, or a perfluoroalkyl of 1 to 8, preferably 1 to 3, carbon atoms, and, (2) optionally, minor amounts (i.e., less than 50% by weight of said fluoropolymer) of perfluoro(alkyl vinyl ether) having, for example, 1 to 4 carbon atoms, e.g., perfluoro(methyl vinyl ether), and/or low molecular weight non-fluorinated alphaolefins, e.g., ethylene and propylene, said fluoropolymer being in the form of a matrix in which is dispersed (b) a small amount (i.e., less than 20% by weight of the composition) of a hydrocarbon polymer component comprising a polymer of ethylene or propylene, such as a homopolymer of ethylene or propylene or copolymer of them with each other or either or both of them with one or more other ethylenically-unsaturated comonomers, such as higher alpha-olefins, e.g., 1-octene. Preferably the hydrocarbon polymer component is a polyolefin, e.g., polyethylene, having a melt viscosity which matches or is about the same as the melt viscosity of the fluoropolymer component. The hydrocarbon polymer component is uniformly dispersed in said fluoropolymer matrix.

In another aspect, this invention provides a method of making a shaped article of such melt-processable fluoroplastic compositions. That method comprising blending (a) a major amount of a melt-processable, thermoplastic fluoropolymer component of interpolymerized units derived from vinylidene fluoride and more than 25 wt. % ethylenically-unsaturated, copolymerizable, fluorinated comonomer, and (b) a small amount of a hydrocarbon polymer component comprising a polymer of ethylene or propylene, and melt-processing the resulting blend to form said article.

The hydrocarbon polymer component, used as a blend component in making the melt-processable fluoroplastic compositions of this invention, is a non-fluorinated polymer (and characterizing it as "hydrocarbon" distinguishes it from the fluoropolymer blend component).

The hydrocarbon polymer component is fluid at the melt-processing temperature of the fluoropolymer component, for example, 180° to 280° C., and is liquid or, preferably, solid at ambient temperature (e.g., 20° C.) where the fluoropolymer component is solid. The hydrocarbon polymer component and the fluoropolymer component are immiscible, as evidenced, for example, under optical microscopic examination or by the cloudy, white, or opaque appearance of extrudates of the blend composition when the composition does not contain some adjuvant, such as filler, which imparts a color to the composition. The extrudates essentially retain physical properties of the fluoropolymer, such as thermal stability, e.g., at 220°–280° C., but, as compared to extrudate thereof, exhibit improved melt processability or extrusion behavior in that the extrudates of the blend composition of this invention can be extruded at higher output rates or faster rates for a given extrudate shape and at much higher shear rates with much reduced shear stress, and the extrudates have good quality surfaces, particularly smoothness, and are otherwise relatively free of objectionable melt defects or fracture, such as "sharkskin."

Preferably the above-described fluoropolymers used in this invention are those hydrogen-containing thermoplastics having an ASTM D 1238 melt flow index of less than 1000 g/min. measured at 265° C. with a loading of 5 kg and are melt extrudable at 250° C. And the fluoropolymers preferably have at least 5 wt % of their interpolymerized units derived from vinylidene fluoride and more than 25 wt % of their interpolymerized units derived from a combination of tetrafluoroethylene and hexafluoropropylene such that the fluoropolymers have an amount of fluorine below 75 wt % and are melt-extrudable thermoplastics.

A preferred class of the fluoropolymers used in this invention is derived by copolymerizing 30 to 70 wt %, preferably 35 to 65 wt % tetrafluoroethylene, 10 to 30 wt %, preferably 15 to 25 wt % hexafluoropropylene, and 10 to 50 wt %, preferably 15 to 45 wt % vinylidene fluoride. A subclass of the fluoropolymer useful in making blends of this invention are fluoroplastics which contain interpolymerized units derived from copolymerization of a monomer charge of 45 to 65 wt % tetrafluoroethylene, 10 to 20 wt % hexafluoropropylene, and 20 to 35 wt % vinylidene fluoride. This class, described in U.S. Pat. No. 4,670,503 (Newmann et al.), have melting points of 130° to 170°, measured by "Differential Scanning Calorimetry", and a value of 50 to 250 g/10 min. for the melt index, measured at 265° C. and 5 kg.

Commercial fluoropolymers which can be used are said THV Fluoroplastics, which are described in product bulletins 98 0211-7703-9(103.02)R1, 98 0211-7010-9, -7011-7, -7012-6, -7013-3, -7014-1, and -8100-7 of the 3M Company. Grades THV 200, THV 400, and THV 500 of these fluoroplastics have ASTM D 3418 melting ranges of 115°–125° C., 150°–160° C., and 165°–180° C., respectively, and ASTM D 1238 melt flow indices of 20, 10, and 10, respectively, at 265° C. and 5 kg. The descriptions of said 3M THV Fluoroplastics in said product bulletins are incorporated herein by reference.

The hydrocarbon olefin polymers used in this invention can be a polymer obtained by the homopolymerization of ethylene or propylene or the copolymerization of them with each other or either or both of them with one or more higher alpha-olefins and up to about 30 wt %, but preferably 20 wt % or less, of one or more ethylenically-unsaturated comonomers which are copolymerizable with such olefins, e.g., vinyl ester compounds, such as vinyl acetate. Said olefins can be represented by the general structure $CH_2=CHR$, where R is a hydrogen or an alkyl radical which contains not more than 10 carbon atoms and preferably 1 to 6 carbon atoms. Representative olefins are ethylene, propylene, 1-butene, 4-methyl-l-pentene, 1-hexene, and 1-octene. Representative monomers which are copolymerizable with said olefins are vinyl esters, such as vinyl acetate, vinyl propionate, vinyl butyrate, vinyl chloroacetate, and vinyl chloropropionate; vinyl alcohol; acrylic and alphaalkyl acrylic acids and their alkyl esters, amides, and nitriles, such as acrylic acid, methacrylic acid, ethacrylic acid, methyl acrylate, ethyl acrylate, N,N-dimethyl acrylamide, methacrylamide, and acrylonitrile; vinyl aromatics, such as styrene, o-methoxystyrene, p-methoxystyrene, and vinyl naphthalene; vinyl and vinylidene halides, such as vinyl chloride, vinylidene chloride, and vinylidene bromide; alkyl esters of maleic and fumaric acids and anhydrides, such as dimethyl maleate, diethyl maleate, and maleic anhydride; vinyl alkyl ethers, such as vinyl methyl ether, vinyl ethyl ether, vinyl isobutyl ether, and 2-chloroethyl vinyl ether; vinyl pyridine; N-vinyl carbazole; N-vinyl pyrolidone; and dienes, such as 1,3-butadiene. The hydrocarbon olefin polymers also can be metallic salts of said olefin copolymers which contain free carboxylic acid groups. Illustrative of the metals which can be used to provide the salts of said carboxylic acid polymers are mono-, di-, and tri-valent metals, such as sodium, lithium, potassium, calcium, magnesium, aluminum, barium, zinc, zirconium, beryllium, iron, nickel, and cobalt. Representative examples of hydrocarbon olefin polymers useful in this invention are polyethylene, polypropylene, and copolymers of ethylene and propylene with one another and/or 1-butene, 1-hexene, 4-methyl-l-pentene, or 1-octene.

Representative blends of the hydrocarbon olefin polymers useful in this invention are blends of polyethylene and polypropylene, low-density polyethylene and high-density polyethylene, and polyethylene and olefin copolymers containing said copolymerizable monomers, some of which are described above, e.g., ethylene and acrylic acid copolymers; ethylene and methyl acrylate copolymers; ethylene and ethyl acrylate copolymers; ethylene and vinyl acetate copolymers, and ethylene, acrylic acid, and vinyl acetate copolymers.

The preferred hydrocarbon olefin polymers are thermoplastic polymers which are homopolymers of ethylene and copolymers of ethylene with 1-butene, 1-hexene, 1-octene, 4-methyl-l-pentene, and propylene.

Commercially available hydrocarbon olefin polymers which can be used in this invention include mscorene™ LL-3001.00, LL-5202, LD411.09, and LD760.36 polyethylenes, Iotek™ 7030 ionomer, and Escor™ ATX310 acid terpolymer, all from Exxon Chem. Co.; ER1833 polyethylene from Chevron Chemical Co.; Novapol™ TF 0119F polyethylene from Novacor Chemicals, Inc.; Dowlex™ 2047 polyethylene from Dow Chemical Co.; Marlex™ HMN 4550 polyethylene from Phillips 66 Co.; 3374X polypropylene from Fina Oil and Chemical Co.; and Polysar™ EPM 306 and EPDM 345 ethylene, propylene rubbers from Miles, Inc., Polysar Rubber Div.

The hydrocarbon polymer preferably has a melt flow between 0.01 and 1000, and more preferably between 0.1 and 100, g/10 min. as measured by ASTM D 1238 at 190° C. and 2.16 kg. A preferred hydrocarbon olefin polymer is polyethylene.

Two or more of the above-described hydrocarbon olefin polymers can be used as blend component (b). Or one or more of such polymers can be blended and used together with poly(oxyalkylene) polymers, such as polyethylene glycol, as blend component (b), each being, for example, 5 to 95 wt. % of the hydrocarbon blend component (b).

The poly(oxyalkylene) polymers, useful in this invention together with the hydrocarbon olefin polymer, can include poly(oxyalkylene) polyols and their derivatives which are also to be blended with and dispersed in the fluoropolymer. A class of such poly(oxyalkylene) polymers can be represented by the general formula:

$$A[(OR^1)_xOR^2]_y$$

where A is an active hydrogen-free residue of a low molecular weight, initiator organic compound having a plurality of active hydrogen atoms (e.g., 2 or 3), such as a polyhydroxyalkane or a polyether polyol, e.g., ethylene glycol, glycerol, 1,1,1-trimethylol propane, and poly(oxypropylene) glycol; y is 2 or 3; the $(OR^1)_x$ is a poly(oxyalkylene) chain having a plurality of oxyalkylene groups, $(OR^1)$, wherein the $R^1$ moieties can be the same or different and are selected from the group consisting of $C_1$ to $C_5$ alkylene radicals and, preferably, $C_2$ or $C_3$ alkylene radicals; and x is the number of oxyalkylene units in said chain. Said poly(oxyalkylene) chain can be a homopolymer chain, e.g., poly(oxyethylene) or poly(oxypropylene), or can be a chain of randomly distributed (i.e., a hereric mixture) oxyalkylene groups, e.g., a copolymer of —$OC_2H_4$— and —$OC_3H_6$— units, or can be a chain having alternating blocks or backbone segments of repeating oxyalkylene groups, e.g., a polymer comprising $-(OC_2H_4)_a$ and $-(OC_3H_6)_b$ blocks, where a+b=5 to 5000 or higher, e.g., 20,000 or more, and preferably 10 to 500. $R^2$ is H or an organic radical, such as alkyl, aryl, or combination thereof, such as aralkyl or alkaryl, and may contain O or N hetero atoms. For example, $R^2$ can be methyl, butyl, phenyl, benzyl, and acyl groups such as acetyl ($CH_3CO$—), benzoyl ($C_6H_5CO$—) and stearyl ($C_{17}H_{35}CO$—)

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g., stearate groups, ($C_{17}H_{35}COO$—). Other useful poly(oxyalkylene) derivatives are polyesters, e.g., prepared from dicarboxylic acids and poly(oxyalkylene) glycols. Preferably, the major proportion of the poly(oxyalkylene) polymer derivative by weight will be the repeating oxyalkylene groups, $(OR^1)$. Said poly(oxyalkylene) polyols and their derivatives can be those which are solid at room temperature and have a molecular weight of at least about 200 and preferably a molecular weight of about 400 to 20,000 or higher, e.g., 200,000 or more.

Poly(oxyalkylene) polyols useful in this invention include those of the formula $H(OC_2H_4)_nOH$ where n is about 15 to 3000, such as those sold under the trademark Carbowax, such as Carbowax™ PEG 8000, where n is about 181, and those sold under the tradename Polyox, such as Polyox™ WSR N-10, where n is about 2272.

The lower limit of amount of the hydrocarbon polymer component (b) to be blended with the fluoropolymer component (a) will generally be an amount at which an increase in extrusion rate of the blend occurs before surface defects are observed in extrudates of the blend, as compared to the same fluoropolymer that is not blended with the hydrocarbon polymer component (b). Generally, the amount of the hydrocarbon polymer component will be about 0.01 to 10 wt %, more preferably about 0.05 to 5 wt %, and most preferably about 0.1 to 1 wt %, by weight of the fluoropolymer-hydrocarbon polymer blend. Increasing concentrations of the hydrocarbon polymer generally decreases the clarity of the extrudates. Some blends may require larger amount of a particular hydrocarbon polymer component (b) than other hydrocarbon polymers in order that the extrudate have a smooth surface. And some hydrocarbon polymers, such as those hydrocarbon olefin polymers which contain polar moieties derived from polar comonomers or those polymers with low thermal stability, may impart an unacceptable color to the extrudate for applications of the extrudate which require a colorless or clear extrudate. The hydrocarbon olefin polymer to be used preferably has a melt viscosity which matches or is about the same as the melt viscosity of the fluoropolymer. For such matching, the hydrocarbon olefin polymer can be selected such that the ratio of its melt viscosity to the melt viscosity of the fluoropolymer is in the range of ratios of 0.01 to 10, and more preferably in the range of ratios of 0.1 to 1. For such ratio, the viscosities of the two polymers are determined under the same conditions that are representative of those at which the blend of components (a) and (b) will be melt-processed. By selecting viscosity ratios in the preferred range, lower amounts of the hydrocarbon olefin polymer will give the desired effect on extrudate surface and thereby allow significant retention of the clarity of the fluoropolymer.

The blends of fluoropolymer and hydrocarbon polymer components (a) and (b) can be prepared by blending means usually used in the plastics industry, such as compounding mill, a Banbury mixer, or a mixing extruder in which the hydrocarbon polymer is uniformly distributed throughout the fluoropolymer. The fluoropolymer and the hydrocarbon polymers may be used in the form, for example, of powders, pellets, or granules. The mixing operation is conveniently carried out at a temperature above the melting point of the polymers. It is also feasible to dry-blend the two polymers in the solid state as particulates and then cause uniform distribution of the hydrocarbon polymer in the fluoropolymer matrix by passing the dry blend through a twin-screw melt extruder.

The resulting melt-blended mixture of fluoropolymer and hydrocarbon polymer can be pelleted or otherwise comminuted into desired particulate size and fed to the extruder, which will typically be a single-screw extruder, which melt-processes the blended mixture, for example, at 180° to 280° C., depending upon the melting point, melt viscosity, and thermal stability of the blend. Different types of extruders which can be used to extrude the fluoroplastic compositions of this invention are described, for example, by Rauwendaal, C., "Polymer Extrusion," Hansen Publishers, p. 23–48, 1986.

The die design of the extruder can vary, depending on the desired extrudate to be fabricated. For example, an annular die can be used to extrude tubing, useful in making fuel line hose, such as that described in U.S. Pat. No. 5,284,184 (Noone et al), which description is incorporated herein by reference.

The fluoroplastic blend composition can contain conventional adjuvants such as antioxidants, pigments, and fillers, e.g. titanium dioxide, carbon black, and silica.

EXAMPLES

The following examples illustrate the fluoroplastic compositions and extrudates of this invention and advantages thereof, such as significantly low shear stress and desirable extrudate surface appearance obtained in practicing the invention.

The fluoroplastic used in these examples was commercially available as 3M THV 500 Fluoroplastic, which had interpolymerized units derived from a copolymerization monomer charge of about 20 wt % vinylidene fluoride, 60 wt % tetrafluoroethylene, and 20 wt % hexafluoropropylene. The hydrocarbon polymers used in the Examples (and designated by the code PO-1, PO-2, etc.) were commercial polyolefins, viz, ethylene copolymerized with minor amounts of other olefin comonomers, and these commercial polymer products are described in Table 1. That table also includes, for each polyolefin, the ratios, PO/THV 500, of their melt viscosities to that of the THV 500 fluoroplastic at three different shear rates, the viscosities having been determined at 220° C. using a Rheometerics Dynamic Analyzer, RDA II. Said ratios are all within the desired broad range of ratios, 0.01 to 10, those ratios of PO-2, -3, -4 falling within the desired narrow range of ratios, 0.1 to 1.

Table 2 sets forth the composition and properties of a set of thermoplastic extrudates, Examples 1–10, and that of the control, Example C-1. In all these examples, the fluoropolymer used was THV 500 Fluoroplastic.

TABLE 1

| Commercial Polyethylene Product | | | Melt | | | PO/THV 500 Viscosity Ratios Shear Rate, $s^{-1}$ | | |
|---|---|---|---|---|---|---|---|---|
| Code | Designation | Supplier | Index* | Density | Comonomer | 1 | 10 | 100 |
| PO-1 | ER1833 | Chevron Chem. Co. | 0.3 | 0.920 | 1-hexene | 1.65 | 1.19 | 0.93 |
| PO-2 | LL-3001.00 | Exxon Chem. Co. | 1.0 | 0.917 | 1-hexene | 0.60 | 0.52 | 0.49 |
| PO-3 | 2047 | Dow Chem. Co. | 2.3 | 0.921 | 1-octene | 0.24 | 0.26 | 0.33 |
| PO-4 | HMN 4550 | Phillips 66 Co. | 5.0 | 0.945 | 1-butene | 0.12 | 0.14 | 0.20 |
| PO-5 | LL-5202 | Exxon Chem. Co. | 12 | 0.926 | 1-butene | 0.05 | 0.07 | 0.11 |

*Melt Index determined by ASTM D 1238 at 190° C., 2.16 kg

The fluoroplastic compositions of this invention, consisting essentially of the fluoroplastic and the olefin polymer, used in the Examples, were prepared using the following procedure. To form a masterbatch the polyethylene (pellets or powder) of a blend was melt-mixed at a level of 1 wt % with the fluoroplastic (pellets) using a Haake Rheomix 3000E mixing bowl. Total batch weight was 400 g. The mixing profile used a 2-minute loading period at 15 rpm followed by a 1 minute ramp to 50 rpm that was maintained for an additional 5 minutes. An initial mixing temperature of 230° C. was decreased after 1 minute to 180° C. and held constant for the remainder of the procedure. This profile was sufficient to obtain a constant final torque that insured uniform mixing. Final blend temperatures were in the range of 190°–210° C. Each resulting masterbatch blend was air-cooled and then chopped into approximately 0.5 inch (1.25 cm.) cubes. The appropriate amount of the masterbatch blend was then remixed into the balance of the fluoroplastic component using the above procedure in order to obtain the final desired level of polyethylene in the finished blend. Chopped samples of the finshed blend were ground prior to extrusion to facilitate feeding to a capillary rheometer. Rheological measurements were performed to determine the shear stress of the fluoroplastic compositions at various shear rates and the reduction in shear stress due to the presence of the polyethylene in the composition. Measurements were conducted using an Instron 4202 system with a 3210 Capillary Rheometer. The capillary die had a flat entry with a L/D ratio of about 40/1. The die diameter was 23.2 mils (0.589 mm). Shear stress measurements were made at 155 s$^{-1}$. Samples were extruded at 220° C. following a 10 min. dwell time. Microscopic examination of the air-cooled extrudates was used for visual determination of surface appearance on the extrudate.

Each fluoroplastic blend sample was extruded at several constant shear rates until equilibrium loads for extrusion were reached. Table 2 sets forth the shear stress for a representative constant shear rate, 155 s$^{-1}$. After each sample was extruded and measurements completed, the barrel of the Rheometer was cleaned with a brass brush and gauze, and the die was cleaned with a piece of metal wire. A fluoroplastic without polyethylene was then run through the capillary at a constant shear rate until the predetermined apparent viscosity for the unmodified fluoroplastic was achieved, thus ensuring that all remnants of polymer from the previous extrusion had been removed from the instrument.

TABLE 2

| | Polyethylene | | | Extrudate Appearance | |
|---|---|---|---|---|---|
| Ex. | Code No. | Amount, wt % | Shear stress, @ 155 s$^{-1}$ | Surface | Light transmission |
| C-1 | | 0 | 36.2 psi (250 kPa) | sharkskin | transparent |
| 1 | PO-1 | 0.1 | 32.3 psi (223 kPa) | sharkskin | translucent |
| 2 | PO-2 | 0.1 | 30.6 psi (211 kPa) | partial sharkskin | translucent |
| 3 | PO-3 | 0.1 | 18.3 psi (126 kPa) | smooth | translucent |
| 4 | PO-4 | 0.1 | 25.3 psi (175 kPa) | partial sharkskin | translucent |
| 5 | PO-5 | 0.1 | 29.1 psi (201 kPa) | partial sharkskin | translucent |
| 6 | PO-1 | 1.0 | 25.0 psi (172 kPa) | smooth | white, opaque |
| 7 | PO-2 | 1.0 | 15.8 psi (109 kPa) | smooth | white, opaque |
| 8 | PO-3 | 1.0 | 17.4 psi (120 kPa) | smooth | white, opaque |
| 9 | PO-4 | 1.0 | 17.9 psi (124 kPa) | smooth | white, opaque |
| 10 | PO-5 | 1.0 | 18.1 psi (125 kPa) | smooth | white, opaque |

The data of Table 2 show the desired reduction in shear stress and the desired smoother extrudate surface are provided by blending the fluoroplastic with sufficient polyethylene, as shown by Examples 2–10 in comparison with Example C-1. Although Example 1 also resulted in reduced shear stress, the extrudate had a sharkskin surface (like that of the control, Example C-1) because the amount of the polyethylene was too low, a sufficient amount of that polyethylene resulting (see Example 6) in the desired smooth extrudate surface. Example 3 resulted in an extrudate with desired smoothness even though it was used in the lower amount (0.1 wt %) due to the ratio of its viscosity to that of the fluoropolymer falling in the desired narrow (preferred) range. The data show a dependence on the melt viscosity of the polyolefin and its ability to reduce the shear stress and melt fracture of the fluoropolymer during extrusion. The data also show that the properly selected hydrocarbon olefin polymer can give a shear stress reduction equivalent to that of other hydrocarbon olefin polymer even when the latter are present at much higher concentrations (cf. Ex. 3 and Ex. 6). Selection of the best hydrocarbon olefin polymer permits the lowest use level allowing benefits, such as improved clarity.

Various modifications and alterations of this invention will become apparent to those skilled in the art without departing from the scope and spirit of this invention.

What is claimed is:

1. A melt-processable fluoroplastic composition consisting essentially of a blend of:
   (a) a major amount of a melt-processable, thermoplastic fluoropolymer component having at least 5 wt % of its interpolymerized units derived from vinylidene fluoride and more than 25 wt % of its interpolymerized units derived from a combination of tetrafluoroethylene and hexafluoropropylene; and
   (b) from 0.01 to 20 wt %, to reduce melt defecting of the composition, of a polymer component comprising a polymer of ethylene or propylene.

2. A fluoroplastic composition according to claim 1 wherein said fluoropolymer is a thermoplastic terpolymer derived from copolymerization of 35 to 70 wt % tetrafluoroethylene, 10 to 30 wt % hexafluoropropylene, and 10 to 50 wt % vinylidene fluoride.

3. A fluoroplastic composition according to claim 1 wherein said fluoropolymer has an ASTM D 1238 melt flow index of less than 1000 g/min, measured at 265° C. and 5 kg.

4. A fluoroplastic composition according to claim 1 wherein said polymer component comprises a homopolymer of ethylene or propylene.

5. A fluoroplastic composition according to claim 1 wherein said polymer component comprises a copolymer of ethylene and propylene.

6. A fluoroplastic composition according to claim 1 wherein said polymer component comprises a copolymer of ethylene and propylene or either or both of them with other ethylenically-unsaturated comonomers.

7. A fluoroplastic composition according to claim 1 wherein said polymer component comprises copolymers of ethylene and propylene or either of them with higher alpha-olefins.

8. A fluoroplastic composition according to claim 1 wherein said hydrocarbon polymer component comprises a copolymer of ethylene and a monomer selected from the group consisting of 1-butene, 1-hexene, 4-methyl-1-pentene, and 1-octene.

9. A fluoroplastic composition according to claim 1 wherein said polymer component comprises a homopolymer of ethylene.

10. A fluoroplastic composition according to claim 1 wherein said polymer component comprises a homopolymer of propylene.

11. A fluoroplastic composition according to claim 1 wherein said hydrocarbon polymer component comprises a polymer having a melt viscosity which matches the melt viscosity of the fluoropolymer.

12. A fluoroplastic composition according to claim 1 wherein said polymer component comprises a polymer having a melt flow index between 0.1 and 1000 g/min. as measured by ASTM D 1238 at 190° C. and a load of 2.16 kg.

13. A fluoroplastic composition according to claim 1 wherein said polymer component further comprises a poly(oxyalkylene) polymer.

14. An extrudate comprising the blend of claim 1.

15. An extruded film comprising the blend of claim 1.

16. A tubing comprising the blend of claim 1.

17. A method of making the fluoroplastic composition of claim 1, which comprises blending said components (a) and (b).

18. A method of making a shaped plastic article which comprises blending a mixture consisting essentially of (a) a major amount of a melt-processable, thermoplastic fluoroplastic polymer component having at least 5 wt % of its interpolymerized units derived from vinylidene fluoride and more than 25 wt % of its interpolymerized units derived from a combination of tetrafluoroethylene and hexafluoropropylene and (b) from 0.01 to 20 wt %, to reduce melt defecting of the composition, of a polymer component comprising a polymer of ethylene or propylene and melt processing the mixture to form a plastic article.

19. The method according to claim 18 wherein said melt-processing comprises extrusion.

20. A method of reducing melt-defects in an extruded melt-processable thermoplastic fluoroplastic polymer having at least 5 wt % of its interpolymerized units derived from vinylidene fluoride and more than 25 wt % of its interpolymerized units derived from a combination of tetrafluoroethylene and hexafluoropropylene which consists essentially of adding to the polymer from 0.01 to 20 wt % of a hydrocarbon polymer component comprising a polymer of ethylene or propylene and extruding the mixture to form the desired plastic article.

* * * * *

UNITED STATES PATENT AND TRADEMARK OFFICE
CERTIFICATE OF CORRECTION

PATENT NO.: 5,549,948

DATED: August 27, 1996

INVENTOR(S): Thomas J. Blong and Claude Lavallée

It is certified that error appears in the above-identified patent and that said Letters Patent is hereby corrected as shown below:

In the Abstract, line 6, "poller" should read -- polymer --.

Col. 4, line 39, "mscorene™" should read -- Escorene™ --.

Col. 5, line 15, "hereric" should read -- heteric --.

Col. 10, Claim 11, line 5, after "wherein said", delete "hydrocarbon".

Col. 10, Claim 20, line 41, delete "hydrocarbon".

Signed and Sealed this

Eighth Day of April, 1997

*Attest:*

BRUCE LEHMAN

*Attesting Officer*  Commissioner of Patents and Trademarks